(12) United States Patent
Petrak

(10) Patent No.: US 6,626,502 B1
(45) Date of Patent: Sep. 30, 2003

(54) WHEEL ADAPTOR PLATE SYSTEM

(76) Inventor: Darryl L. Petrak, 211 S. Beech Box 665, House, NM (US) 88121

( * ) Notice: Subject to any disclaimer, the term of this patent is extended or adjusted under 35 U.S.C. 154(b) by 0 days.

(21) Appl. No.: 10/200,458

(22) Filed: Jul. 22, 2002

Related U.S. Application Data

(63) Continuation of application No. 29/144,304, filed on Jun. 29, 2001.

(51) Int. Cl.[7] .......................... B60B 1/00; B60B 25/00; B60B 23/00
(52) U.S. Cl. ............... 301/35.631; 301/9.1; 301/35.629
(58) Field of Search .................. 301/9.1, 9.2, 35.621, 301/35.623, 35.625, 35.629, 35.631

(56) References Cited

U.S. PATENT DOCUMENTS

| | | | |
|---|---|---|---|
| 2,453,635 A | | 11/1948 | Martin, Jr. |
| 2,590,363 A | * | 3/1952 | Adair .......................... 301/9.1 |
| 2,619,389 A | | 11/1952 | James |
| 3,166,357 A | * | 1/1965 | Vachon et al. ............... 301/9.1 |
| 3,459,455 A | * | 8/1969 | Muench et al. .............. 301/9.1 |
| 3,580,320 A | | 5/1971 | Roberts |
| 3,820,851 A | | 6/1974 | Longo et al. |
| 3,834,766 A | | 9/1974 | Thousand |
| 3,869,174 A | * | 3/1975 | Brown et al. .......... 301/35.629 |
| 3,916,971 A | | 11/1975 | Carpenter et al. |
| 4,135,765 A | | 1/1979 | Hardwicke |
| 4,165,904 A | * | 8/1979 | Reppert .................. 301/35.631 |
| 4,478,081 A | | 10/1984 | Greene |
| 4,585,276 A | | 4/1986 | Tirheimer |
| 4,718,732 A | * | 1/1988 | Osborne .................... 301/36.1 |
| 5,197,785 A | | 3/1993 | Berry |
| 5,362,134 A | * | 11/1994 | Carmona ............... 301/35.629 |
| 5,785,391 A | | 7/1998 | Parry et al. |
| D398,691 S | | 9/1998 | Bromley |
| 6,238,009 B1 | * | 5/2001 | Lovitt, Jr. .............. 301/35.629 |

\* cited by examiner

*Primary Examiner*—S. Joseph Morano
*Assistant Examiner*—Jason R. Bellinger

(57) ABSTRACT

A wheel adaptor plate system for permitting mounting of a wheel rim onto a hub having a different lug bolt pattern. The wheel adaptor plate system includes a plate member comprising a plurality of mounting apertures extending through the plate member. The plate member is designed for being coupled to the hub whereby each of a plurality of lug bolts extend through one of the mounting apertures. Each of a plurality of stud members is selectively extendable through one of the mounting apertures of the plate member for being selectively extendable through holes in the wheel rim. Each of a plurality of nut members is selectively coupled to one of the stud members for securing the wheel rim between the nut members and the plate member when the wheel rim has a pattern of holes different than the pattern of the lug bolts of the hub.

19 Claims, 3 Drawing Sheets

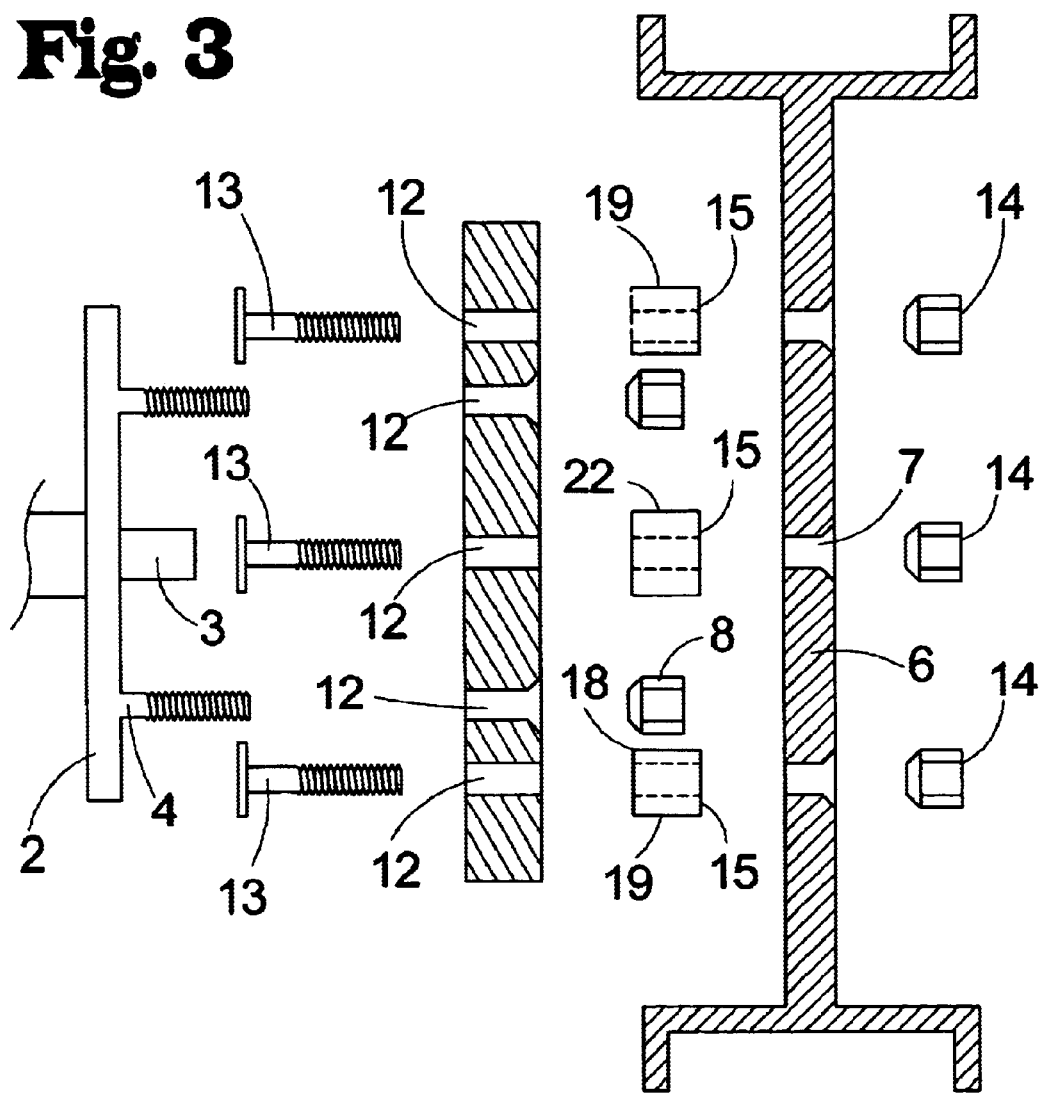

WHEEL ADAPTOR PLATE SYSTEM

CROSS REFERENCE TO RELATED APPLICATION

This application is a continuation of my prior design patent application Ser. No. 29/144,304, filed Jun. 29, 2001.

BACKGROUND OF THE INVENTION

1. Field of the Invention

The present invention relates to hub adaptors and more particularly pertains to a new wheel adaptor plate system for permitting mounting of a wheel rim onto a hub having a different lug bolt pattern.

2. Description of the Prior Art

The use of hub adaptors is known in the prior art. U.S. Pat. No. 2,453,635 describes a device for permitting wheel rim having a greater amount of holes than the hub has lug bolts to mounted on the hub. Another type of hub adaptor is U.S. Pat. No. 2,619,389 having an adapted for permitting a larger wheel rim to be mounted a hub designed for a smaller rim. U.S. Pat. No. 3,580,320 has a circular plate with pins for receiving a Volkswagen wheel or an eight-lug Pontiac wheel. U.S. Pat. No. 5,197,785 has a two piece adaptor rim for permitting larger tires to mounted on a smaller hub. U.S. Pat. No. 3,916,971 has an adaptor for use with a tire changing stand that allows the tire changing stand to be used with decorative rims without marring the decorative rims. U.S. Pat. No. Des. 398,691 shows a wheel hub.

While these devices fulfill their respective, particular objectives and requirements, the need remains for a system that has certain improved features that allows a variety of wheel rims having different hole configurations to be mounted on hubs having different lug bolt configurations.

SUMMARY OF THE INVENTION

The present invention meets the needs presented above by providing a plurality of sets of mounting apertures permitting wheel rims having a different hole configuration than the lug bolt configuration of the hub to be mounted on the hub.

Still yet another object of the present invention is to provide a new wheel adaptor plate system that provide a plurality of spacer members to inhibit the wheel rim from abutting against the lug nuts use the couple the plate member to the hub.

To this end, the present invention generally comprises a plate member comprising a plurality of mounting apertures extending through the plate member. The plate member is designed for being coupled to the hub whereby each of a plurality of lug bolts extend through one of the mounting apertures of the plate member. Each of a plurality of stud members is selectively extendable through one of the mounting apertures of the plate member. Each of the stud members is designed for being selectively extendable through holes in the wheel rim. Each of a plurality of nut members is selectively coupled to one of the stud members. Each of the nut members is designed for securing the wheel rim between the nut members and the plate member for securing the wheel rim to the hub when the wheel rim has a pattern of holes different than the pattern of the lug bolts of the hub.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded cross-sectional view of the present invention shown in use.

DESCRIPTION OF THE PREFERRED EMBODIMENT

Figure 1:
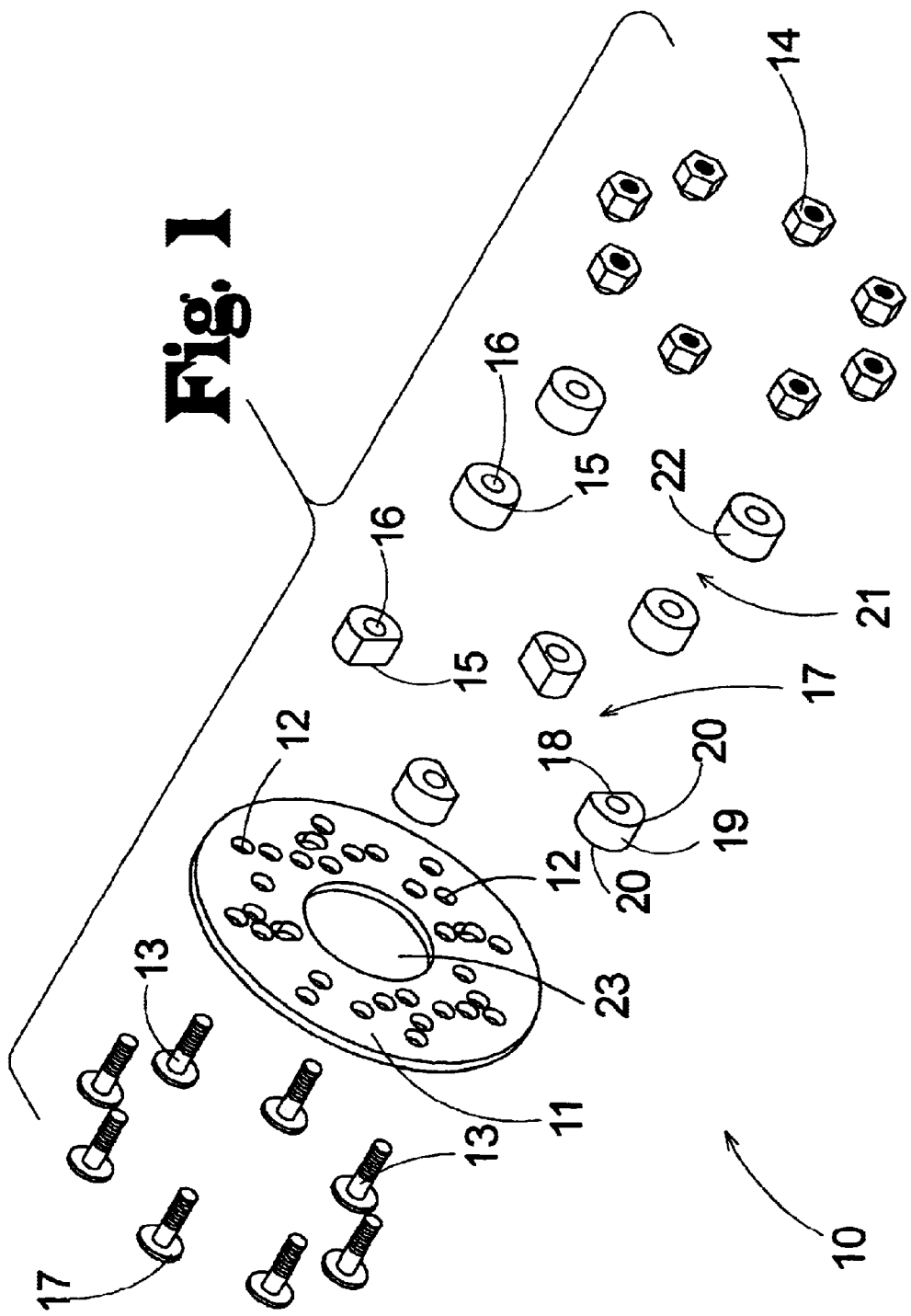
FIG. 1 is a perspective view of a new wheel adaptor plate system according to the present invention.
Figure 2:
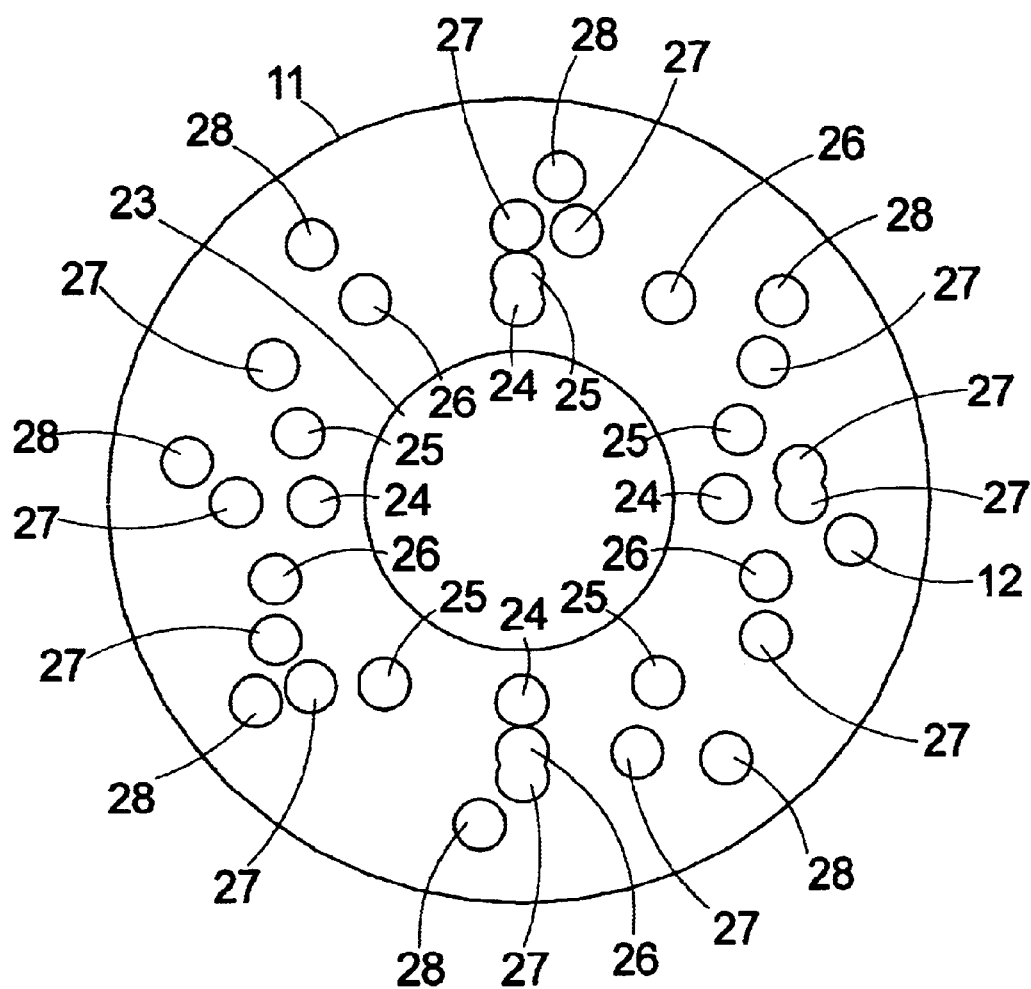
FIG. 2 is a front view of the present invention.

With reference now to the drawings, and in particular to FIGS. 1 through 3 thereof, a new wheel adaptor plate system embodying the principles and concepts of the present invention and generally designated by the reference numeral 10 will be described.

As best illustrated in FIGS. 1 through 3, the wheel adaptor plate system 10 generally comprises a plate member 11 comprising a plurality of mounting apertures 12 extending through the plate member 11. The plate member 11 is designed for being coupled to the hub 2 whereby each of a plurality of lug bolts 4 extend through one of the mounting apertures 12 of the plate member 11 and are engaged by lug nuts 8.

Each of a plurality of stud members 13 is selectively extendable through one of the mounting apertures 12 of the plate member 11. Each of the stud members 13 is designed for being selectively extendable through holes in the wheel rim 6.

Each of a plurality of nut members 14 is selectively coupled to one of the stud members 13. Each of the nut members 14 is designed for securing the wheel rim 6 between the nut members 14 and the plate member 11 for securing the wheel rim to the hub 2 when the wheel rim has a pattern of holes different than the pattern of the lug bolts 4 of the hub.

One of a plurality of spacer members 15 is selectively positionable around each of the stud members 13. Each of the spacer members 15 is designed for being positioned between the plate member 11 and the wheel rim when the wheel rim is coupled to the stud members 13 whereby the spacer members 15 are for preventing the wheel rim from abutting against a plurality of lug nuts of the hub securing the plate member 11 to the lug bolts of the hub.

Each of the plurality of spacer members 15 comprises a bore 16 extending through the associated one of the spacer members 15. The bore 16 of each of the spacer members 15 selectively receives one of the stud members 13 whereby each of the spacer members 15 is positioned around an associated one the stud members 13.

The plurality of spacer members 15 comprises a set of adjacent spacers 17. Each of the spacer members 15 of the set of adjacent spacers 17 comprises a planar surface 18 and an arcuate surface 19. The planar surface 18 is positioned in a spaced relationship to the bore 16 of the associated one of the spacer members 15. The arcuate surface 19 arcuately extends between opposing ends 20 of the planar surface 18 whereby the bore 16 is positioned between the planar surface 18 and the arcuate surface 19. The planar face of each of the spacer members 15 of the set of adjacent spacers 17 is designed for being positioned proximate one of the lug nuts of the hub when the associated one of the stud members 13 is positioned proximate one of the lug nuts of the hub for permitting the spacer members 15 of the set of adjacent spacers 17 to abut the plate member 11 when the plate member 11 is coupled to the hub.

The plurality of spacer members 15 comprises a set of cylindrical spacers 21. Each of the spacer members 15 of the set of cylindrical spacers 21 comprises a perimeter wall 22. The perimeter wall 22 is annularly positioned around the bore 16 of the associated one of the spacer members 15. Each of the spacer members 15 of the set of cylindrical spacers 21 is positioned around the associated one of the stud members 13 whereby the spacer members 15 of the set of cylindrical spacers 21 abut the plate member 11.

The plate member 11 comprises a centering aperture 23 extending through the plate member 11. The centering aperture 23 is designed for receiving a bearing portion 3 of the hub 2 whereby the centering aperture 23 centers the plate member 11 on the hub when the center aperture of the plate member 11 receives the bearing portion of the hub. The centering aperture 23 has a diameter of about 2⅞ to 3 inches.

The plurality of wheel-mounting apertures 12 comprise a plurality of sets of mounting apertures 12 that may be employed for aligning with lug bolts 4 of a hub 2 of for aligning with the holes 7 of the wheel rim 6. The wheel-mounting apertures 12 of each of the sets of wheel-mounting apertures 12 is radially positioned around a axis of the plate member 11. One of the sets of mounting apertures 12 may receive the lug bolts 4 of the hub 2 and another of the sets of mounting apertures 12 may receive the stud members 13 for allowing the wheel rim having a pattern of holes different than the pattern of the lug bolts of the hub to be mounted to the hub.

The sets of mounting apertures 12 comprise a first set 24 of mounting apertures 12. Each of the mounting apertures 12 of the first set 24 of mounting apertures 12 is radially positioned a first distance from the axis of the plate member 11. The mounting apertures 12 of the first set 24 of mounting apertures 12 are positioned in a circle having a diameter of about 4 inches.

Each of the mounting apertures 12 of the first set 24 of mounting apertures 12 is positioned at an angle from the axis of the plate member 11s from an adjacent one of the mounting apertures 12 of the first set 24 of mounting apertures 12. The mounting apertures 12 of the first set 24 of mounting apertures 12 are positioned at angles of 0 degrees, 90 degrees, 180 degrees and 270 degrees clockwise from a reference line extending from the axis to a top center of the plate member 11.

The sets of mounting apertures 12 comprise a second set 25 of mounting apertures 12. Each of the mounting apertures 12 of the second set 25 of mounting apertures 12 is radially positioned a second distance from the axis of the plate member 11. The mounting apertures 12 of the second set 25 of mounting apertures 12 are positioned in circle having a diameter of about 4½ inches.

Each of the mounting apertures 12 of the second set 25 of mounting apertures 12 is positioned at an angle from the axis of the plate member 11 from an adjacent one of the mounting apertures 12 of the second set 25 of mounting apertures 12. The mounting apertures 12 of the second set 25 of mounting apertures 12 are positioned at angles of 0 degrees, 72 degrees, 144 degrees, 216 degrees and 288 degrees clockwise from a reference line extending from the axis to a top center of the plate member 11.

The sets of mounting apertures 12 comprise a third set 26 of mounting apertures 12. Each of the mounting apertures 12 of the third set 26 of mounting apertures 12 is radially positioned a third distance from the axis of the plate member 11. Each of the mounting apertures 12 of the third set 26 of mounting apertures 12 are positioned in circle having a diameter of about 5 inches.

Each of the mounting apertures 12 of the third set 26 of mounting apertures 12 is positioned at an angle from the axis of the plate member 11 from an adjacent one of the mounting apertures 12 of the third set 26 of mounting apertures 12. The mounting apertures 12 of the third set 26 of mounting apertures 12 are positioned at angles of 36 degrees, 108 degrees, 180 degrees, 252 degrees and 324 degrees clockwise from a reference line extending from the axis to a top center of the plate member 11.

The sets of mounting apertures 12 comprise a fourth set 27 of mounting apertures 12. Each of the mounting apertures 12 of the fourth set 27 of mounting apertures 12 is radially positioned a fourth distance from the axis of the plate member 11. Each of the mounting apertures 12 of the fourth set 27 of mounting apertures 12 are positioned in a circle having a diameter of about 5½ inches.

Each of the mounting apertures 12 of the fourth set 27 of mounting apertures 12 is positioned at an angle from the axis of the plate member 11 from an adjacent one of the mounting apertures 12 of the fourth set 27 of mounting apertures 12. The mounting apertures 12 of the fourth set 27 of mounting apertures 12 are positioned at angles of 0 degrees, 12 degrees, 60 degrees, 84 degrees, 90 degrees, 120 degrees, 156 degrees, 180 degrees, 228 degrees, 240 degrees, 270 degrees and 300 degrees clockwise from a reference line extending from the axis to a top center of the plate member 11 to accommodate 4, 5, and 6 lug bolt patterns.

The sets of-mounting apertures 12 comprise a fifth set 28 of mounting apertures 12. Each of the mounting apertures 12 of the fifth set 28 of mounting apertures 12 is radially positioned a fifth distance from the axis of the plate member 11. Each of the mounting apertures 12 of the fifth set 28 of mounting apertures 12 being positioned in a circle having a diameter of about 6½ inches Each of the mounting apertures 12 of the fifth set 28 of mounting apertures 12 is positioned at an angle from the axis of the plate member 11 from an adjacent one of the mounting apertures 12 of the fifth set 28 of mounting apertures 12. The mounting apertures 12 of the fifth set 28 of mounting apertures 12 are positioned at angles of 7½ degrees, 52½ degrees, 97½ degrees, 142½ degrees, 187½ degrees, 232½ degrees, 277½ degrees and 322½ degrees clockwise from a reference line extending from the axis to a top center of the plate member 11.

In use, the user places the stud members 13 through one of the sets of mounting apertures 12 of the plate member 11 that matches the pattern of holes in the wheel rim. The plate member 11 is then placed onto the hub so that the lug bolts extend through one of the other sets of mounting apertures 12. The lug nuts of the hub are then tightened onto the lug bolts to secure the plate member 11 to the hub. The spacer members 15 are then placed onto the stud members 13 and then the holes of the wheel rim receive the stud members 13. The nut members 14 are then coupled to the stud members 13 to secure the wheel rim to the plate member 11 thus allowing the user to a wheel rim having a different pattern of holes than the pattern of lug bolts on the hub.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel adaptor plate system for mounting a wheel rim to a hub, the wheel adaptor plate comprising:

a plate member comprising a plurality of mounting apertures extending through said plate member, said plate member being adapted for being coupled to the hub such that each of a plurality of lug bolts extend through one of said mounting apertures of said plate member;

each of a plurality of stud members being selectively extendable through one of said mounting apertures of said plate member, each of said stud members being adapted for being selectively extendable through holes in the wheel rim;

each of a plurality of nut members being selectively coupled to one of said stud members, each of said nut members being adapted for securing the wheel rim between said nut members and said plate member for securing the wheel rim to the hub when the wheel rim has a pattern of holes different than the pattern of the lug bolts of the hub;

one of a plurality of spacer members being selectively positionable around each of said stud members, each of said spacer members being adapted for being positioned between said plate member and the wheel rim when the wheel rim is coupled to said stud members such that said spacer members are for preventing the wheel rim from abutting against a plurality of lug nuts of the hub securing said plate member to the lug bolts of the hub;

each of said plurality of spacer members comprising a bore extending through the associated one of said spacer members, said bore of each of said spacer members selectively receiving one of said stud members such that each of said spacer members is positioned around an associated one said stud members; and said plurality of spacer members comprising a set of adjacent spacers, each of said spacer members of said set of adjacent spacers comprising a planar surface and an arcuate surface, said planar surface being positioned in a spaced relationship to said bore of the associated one of said spacer members, said arcuate surface arcuately extending between opposing ends of said planar surface such that said bore is positioned between said planar surface and said arcuate surface, said planar face of each of said spacer members of said set of adjacent spacers being adapted for being positioned proximate one of the lug nuts of the hub when the associated one of said stud members is positioned proximate one of the lug nuts of the hub for permitting said spacer members of said set of adjacent spacers to abut said plate member when said plate member is coupled to the hub.

2. The wheel adaptor plate system as set forth in claim 1, further comprising:

said plurality of spacer members comprising a set of cylindrical spacers, each of said spacer members of said said of cylindrical spacers comprising a perimeter wall, said perimeter wall being annularly positioned around said bore of the associated one of said spacer members, each of said spacer members of said set of cylindrical spacers being positioned around the associated one of said stud members such that said spacer members of said set of cylindrical spacers abut said plate member.

3. The wheel adaptor plate system as set forth in claim 1, further comprising:

said plate member comprising a centering aperture extending through said plate member, said centering aperture being adapted for receiving a bearing portion of the hub such that said centering aperture centers said plate member on the hub when said center aperture of said plate member receives the bearing portion of the hub.

4. The wheel adaptor plate system as set forth in claim 1, further comprising:

said plurality of mounting apertures comprising a plurality of sets of mounting apertures, said mounting apertures of each of said sets of mounting apertures being radially positioned around a axis of said plate member, one of said sets of mounting apertures being adapted for receiving the lug bolts of the hub such that another of said sets of mounting apertures receives said stud members for allowing the wheel rim having a pattern of holes different than the pattern of the lug bolts of the hub to be mounted to the hub.

5. The wheel adaptor plate system as set forth in claim 4, further comprising:

said sets of mounting apertures comprising a first set of mounting apertures, each of said mounting apertures of said first set of mounting apertures being radially positioned a first distance from the axis of said plate member.

6. The wheel adaptor plate system as set forth in claimed 5, wherein each of said mounting apertures of said first set of mounting apertures are positioned at an angle from the axis of said plate members from an adjacent one of said mounting apertures of said first set of mounting apertures.

7. The wheel adaptor plate system as set forth in claim 4, further comprising:

said sets of mounting apertures comprising a second set of mounting apertures, each of said mounting apertures of said second set of mounting apertures being radially positioned a second distance from the axis of said plate member.

8. The wheel adaptor plate system as set forth in claim 7, wherein each of said mounting apertures of said second set of mounting apertures are positioned at an angle from the axis of said plate members from an adjacent one of said mounting apertures of said second set of mounting apertures.

9. The wheel adaptor plate system as set forth in claim 4, further comprising:

said sets of mounting apertures comprising a third set of mounting apertures, each of said mounting apertures of said third set of mounting apertures being radially positioned a third distance from the axis of said plate member.

10. The wheel adaptor plate system as set forth in claim 9, wherein each of said mounting apertures of said third set of mounting apertures are positioned at an angle from the axis of said plate members from an adjacent one of said mounting apertures of said third set of mounting apertures.

11. The wheel adaptor plate system as set forth in claim 4, further comprising:
   said sets of mounting apertures comprising a fourth set of mounting apertures, each of said mounting apertures of said fourth set of mounting apertures being radially positioned a fourth distance from the axis of said plate member.

12. The wheel adaptor plate system as set forth in claim 4, wherein each of said mounting apertures of said fourth set of mounting apertures are positioned at an angle from the axis of said plate members from an adjacent one of said mounting apertures of said fourth set of mounting apertures.

13. The wheel adaptor plate system as set forth in claim 4, further comprising:
   said sets of mounting apertures comprising a fifth set of mounting apertures, each of said mounting apertures of said fifth set of mounting apertures being radially positioned a fifth distance from the axis of said plate member.

14. The wheel adaptor plate system as set forth in claim 13, wherein each of said mounting apertures of said fifth set of mounting apertures are positioned at an angle from the axis of said plate members from an adjacent one of said mounting apertures of said fifth set of mounting apertures.

15. A wheel adaptor plate system for mounting a wheel rim to a hub, the wheel adaptor plate comprising:
   a plate member comprising a plurality of mounting apertures extending through said plate member, said plate member being adapted for being coupled to the hub such that each of a plurality of lug bolts extend through one of said mounting apertures of said plate member;
   each of a plurality of stud members being selectively extendable through one of said mounting apertures of said plate member, each of said stud members being adapted for being selectively extendable through holes in the wheel rim;
   each of a plurality of nut members being selectively coupled to one of said stud members, each of said nut members being adapted for securing the wheel rim between said nut members and said plate member for securing the wheel rim to the hub when the wheel rim has a pattern of holes different than the pattern of the lug bolts of the hub;
   one of a plurality of spacer members being selectively positionable around each of said stud members, each of said spacer members being adapted for being positioned between said plate member and the wheel rim when the wheel rim is coupled to said stud members such that said spacer members are for preventing the wheel rim from abutting against a plurality of lug nuts of the hub securing said plate member to the lug bolts of the hub;
   each of said plurality of spacer members comprising a bore extending through the associated one of said spacer members, said bore of each of said spacer members selectively receiving one of said stud members such that each of said spacer members is positioned around an associated one said stud members;
   said plurality of spacer members comprising a set of adjacent spacers, each of said spacer members of said set of adjacent spacers comprising a planar surface and an arcuate surface, said planar surface being positioned in a spaced relationship to said bore of the associated one of said spacer members, said arcuate surface arcuately extending between opposing ends of said planar surface such that said bore is positioned between said planar surface and said arcuate surface, said planar face of each of said spacer members of said set of adjacent spacers being adapted for being positioned proximate one of the lug nuts of the hub when the associated one of said stud members is positioned proximate one of the lug nuts of the hub for permitting said spacer members of said set of adjacent spacers to abut said plate member when said plate member is coupled to the hub;
   said plurality of spacer members comprising a set of cylindrical spacers, each of said spacer members of said set of cylindrical spacers comprising a perimeter wall, said perimeter wall being annularly positioned around said bore of the associated one of said spacer members, each of said spacer members of said set of cylindrical spacers being positioned around the associated one of said stud members such that said spacer members of said set of cylindrical spacers abut said plate member;
   said plate member comprising a centering aperture extending through said plate members, said centering aperture being adapted for receiving a bearing portion of the hub such that said centering aperture centers said plate member on the hub when said center aperture of said plate member receives the bearing portion of the hub;
   said plurality of mounting apertures comprising a plurality of sets of mounting apertures, said mounting apertures of each of said sets of mounting apertures being radially positioned around a axis of said plate member, one of said sets of mounting apertures being adapted for receiving the lug bolts of the hub such that another of said sets of mounting apertures receives said stud members for allowing the wheel rim having a pattern of holes different than the pattern of the lug bolts of the hub to be mounted to the hub;
   said sets of mounting apertures comprising a first set of mounting apertures, each of said mounting apertures of said first set of mounting apertures being radially positioned a first distance from the axis of said plate member;
   each of said mounting apertures of said first set of mounting apertures being positioned at an angle from the axis of said plate members from an adjacent one of said mounting apertures of said first set of mounting apertures;
   said sets of mounting apertures comprising a second set of mounting apertures, each of said mounting apertures of said second set of mounting apertures being radially positioned a second distance from the axis of said plate member;
   each of said mounting apertures of said second set of mounting apertures being positioned at an angle from the axis of said plate members from an adjacent one of said mounting apertures of said second set of mounting apertures;
   said sets of mounting apertures comprising a third set of mounting apertures, each of said mounting apertures of said third set of mounting apertures being radially positioned a third distance from the axis of said plate member;

each of said mounting apertures of said third set of mounting apertures being positioned at an angle from the axis of said plate members from an adjacent one of said mounting apertures of said third set of mounting apertures;

said sets of mounting apertures comprising a fourth set of mounting apertures, each of said mounting apertures of said fourth set of mounting apertures being radially positioned a fourth distance from the axis of said plate member;

each of said mounting apertures of said fourth set of mounting apertures being positioned at an angle from the axis of said plate members from an adjacent one of said mounting apertures of said fourth set of mounting apertures;

said sets of mounting apertures comprising a fifth set of mounting apertures, each of said mounting apertures of said fifth set of mounting apertures being radially positioned a fifth distance from the axis of said plate member; and each of said mounting apertures of said fifth set of mounting apertures being positioned at an angle from the axis of said plate members from an adjacent one of said mounting apertures of said fifth set of mounting apertures.

16. The wheel adaptor plate system for mounting a wheel rim to a hub, the wheel adaptor plate comprising:

a plate member comprising a plurality of mounting apertures extending through said plate member, said plate member being adapted for being coupled to the hub such that each of a plurality of lug bolts extend through one of said mounting apertures of said plate member;

each of a plurality of stud members being selectively extendable through one of said mounting apertures of said plate member, each of said stud members being adapted for being selectively extendable through holes in the wheel rim;

each of a plurality of nut members being selectively coupled to one of said stud members, each of said nut members being adapted for securing the wheel rim between said nut members and said plate member for securing the wheel rim to the hub when the wheel rim has a pattern of holes different than the pattern of the lug bolts of the hub; and said plurality of mounting apertures comprising a plurality of sets of mounting apertures, said mounting apertures of each of said sets of mounting apertures being radially positioned around an axis of said plate member, one of said sets of mounting apertures being adapted for receiving the lug bolts of the hub such that another of said sets of mounting apertures receives said stud members for allowing the wheel rim having a pattern of holes different than the pattern of the lug bolts of the hub to be mounted to the hub, said mounting apertures of each of said sets of mounting apertures being positioned radially a unique distance from the axis of said plate member;

one of a plurality of spacer members being selectively positionable around each of said stud members, each of said spacer members being adapted for being positioned between said plate member and the wheel rim when the wheel rim is coupled to said stud members such that said spacer members are for preventing the wheel rim from abutting against a plurality of lug nuts of the hub securing said plate member to the lug bolts of the hub.

17. The wheel adaptor plate system as set forth in claim 16, further comprising:

each of said plurality of spacer members comprising a bore extending through the associated one of said spacer members, said bore of each of said spacer members selectively receiving one of said stud members such that each of said spacer members is positioned around an associated one said stud members.

18. The wheel adaptor plate system as set forth in claim 17, further comprising:

said plurality of spacer members comprising a set of adjacent spacers, each of said spacer members of said set of adjacent spacers comprising a planar surface and an arcuate surface, said planar surface being positioned in a spaced relationship to said bore of the associated one of said spacer members, said arcuate surface arcuately extending between opposing ends of said planar surface such that said bore is positioned between said planar surface and said arcuate surface, said planar face of each of said spacer members of said set of adjacent spacers being adapted for being positioned proximate one of the lug nuts of the hub when the associated one of said stud members is positioned proximate one of the lug nuts of the hub for permitting said spacer members of said set of adjacent spacers to abut said plate member when said plate member is coupled to the hub.

19. The wheel adaptor plate system as set forth in claim 17, further comprising:

said plurality of spacer members comprising a set of cylindrical spacers, each of said spacer members of said set of cylindrical spacers comprising a perimeter wall, said perimeter wall being annularly positioned around said bore of the associated one of said spacer members, each of said spacer members of said set of cylindrical spacers being positioned around the associated one of said stud members such that said spacer members of said set of cylindrical spacers abut said plate member.

* * * * *